J. W. WAGNER.
WORK HOLDER.
APPLICATION FILED AUG. 18, 1919.

1,396,302.

Patented Nov. 8, 1921.
4 SHEETS—SHEET 1.

Inventor
Julian W. Wagner,

By
Attorney

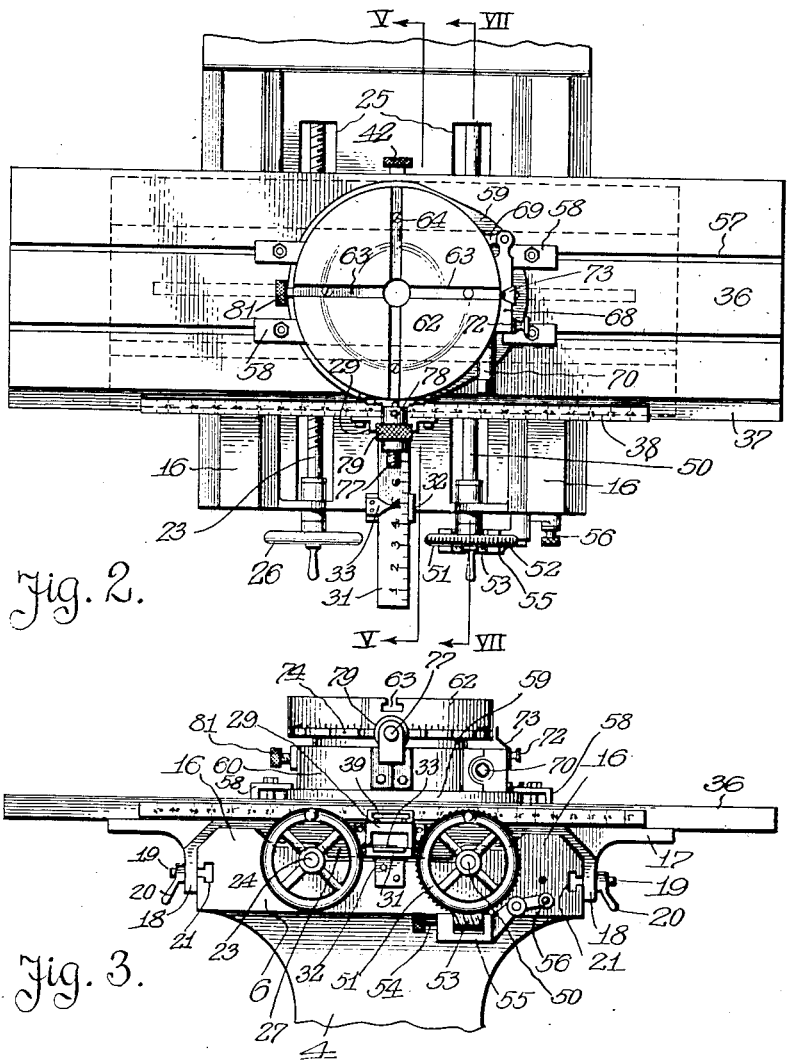

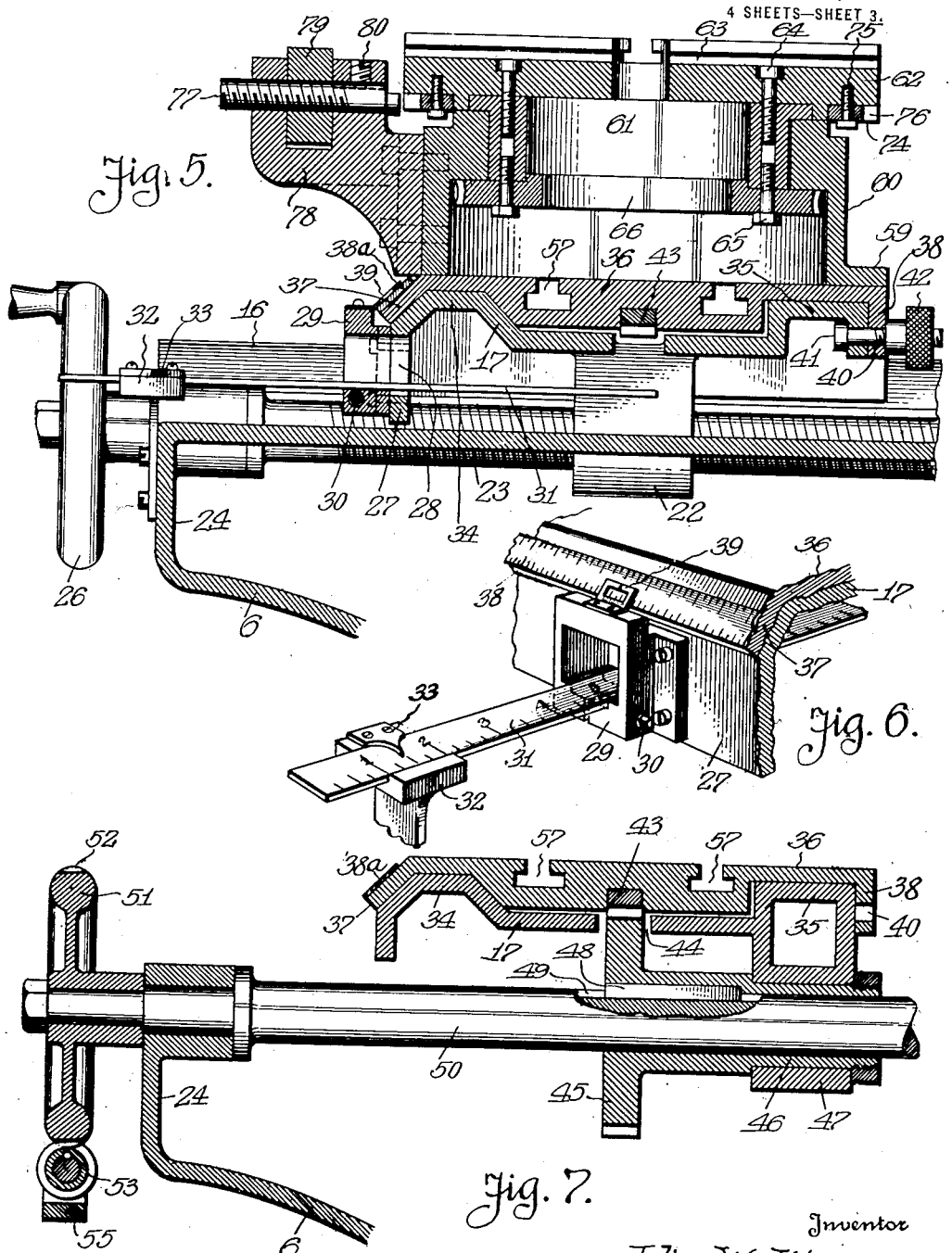

UNITED STATES PATENT OFFICE.

JULIAN W. WAGNER, OF DETROIT, MICHIGAN.

WORK-HOLDER.

1,396,302.  Specification of Letters Patent.  Patented Nov. 8, 1921.

Application filed August 18, 1919. Serial No. 318,271.

*To all whom it may concern:*

Be it known that I, JULIAN W. WAGNER, a citizen of the United States of America, residing at Detroit, in the county of Wayne and State of Michigan, have invented certain new and useful Improvements in Work-Holders, of which the following is a specification, reference being had therein to the accompanying drawings.

In the operation of vertical drilling, boring and cutting machines, considerable trouble is experienced in properly holding and adjusting a piece of work so that the same may be accurately spaced and drilled or otherwise operated upon, particularly when the piece of work is to be provided with a series of spaced openings or recesses.

My invention aims to provide a universal indexing mechanism associated with a work holder so that a piece of work held by the work holder may be accurately positioned and adjusted in various directions. All adjustments are made by hand and some of the adjustments may be made more expeditiously than others, but in each instance it is possible to obtain a minute adjustment which insures accuracy in the drilling or boring operation.

My invention further aims to provide a drilling or boring machine with an adjustable table, an adjustable support, a detachable housing, and a rotatable work holder, all of which are compactly assembled with the adjusting mechanism conveniently located for the operator or attendant of the machine.

My invention still further aims to provide a work holder wherein the parts are constructed with a view of reducing the cost of manufacture and at the same time retaining those features by which safety, durability and ease of assembling are secured. With such ends in view, my invention resides in the novel construction to be hereinafter considered and then claimed.

Reference will now be had to the drawings, wherein—

Fig. 2 is a plan of the work holder;

Fig. 3 is a front elevation of the same;

Fig. 4 is an enlarged vertical sectional view of the base of the drilling machine;

Fig. 5 is an enlarged cross sectional view of the work holder taken on the line V—V of Fig. 2;

Fig. 6 is a perspective view of a table gage;

Fig. 7 is an enlarged cross sectional view taken on the line VII—VII of Fig. 2;

Figure 1:
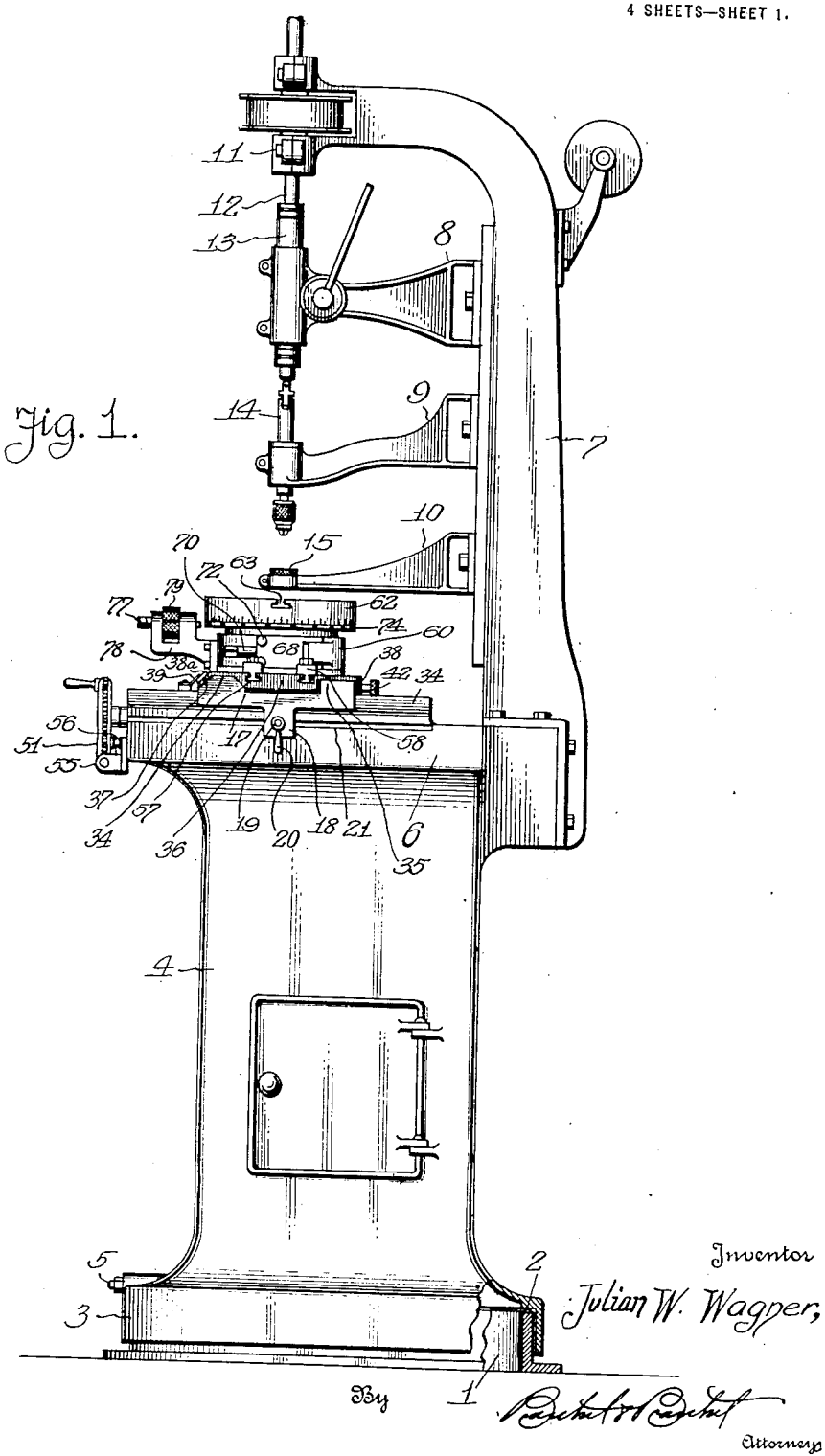
Figure 1 is a side elevation of a drilling or boring machine in accordance with my invention.

In describing my invention by aid of the views above referred to, I desire to point out that the same are intended as merely illustrative of an example by which my invention may be put into practice, and I do not care to confine myself to the precise construction and arrangement of parts, other than defined by the appended claims.

In the drawings, the reference numeral 1 denotes a circular base having the upper edge thereof provided with antifrictional bearings 2 for the lower flared annular end 3 of a machine body 4, which may be rotated on the base 1 and clamped in an adjusted position on said base by a clamping device 5 carried by the lower end of the machine body 4 and adapted to engage the inner wall of the base 1. By having the machine body rotatable relative to its base the machine may be positioned for proper transmission of power thereto. The upper end of the machine body 4 terminates in a knee or bed 6 and at the rear side of the knee 6 is an upright 7 providing a throat in which is located brackets 8, 9 and 10. The upper end of the upright 7 affords bearings 11 for a spindle 12 and the spindle may be driven by a belt or other power transmission devices from a suitable source of power. The spindle 12 extends through a vertical member 13 adjustably supported by the bracket 8, said spindle being in driving relation with the member 13, which is coupled to a drill holder or socket 14 slidable in the bracket 9. When the drill holder or socket 14 is provided with a drill or other tool, the drill or tool is adapted to extend through a guide 15 carried by the bracket 10.

The knee 6 of the machine is provided with shears 16 and slidable on said shears is a table 17 having depending side lugs 18 provided with clamping bolts 19 and nuts 20, said clamping bolts extending into grooves 21 in the sides of the knee 6 so that the table 17 may be locked in an adjusted position. To adjust the table 17 longitudinally of the knee 6 and on the shears 16 thereof, said table has a depending nut portion 22 in screw-threaded engagement with a rotatable screw 23 journaled in the front and rear walls 24 of the knee 6, and the top of said knee is provided with longitudinal slots 25, one of which provides clearance for the nut portion 22 of the table. On the forward end of the screw 23 is a hand wheel 26 which may be revolved to shift the table longitudinally of the knee 6. In order that the adjustment of the table may be accurately made, said table has its front wall 27 provided with an opening 28 and mounted on the wall 27 at said opening is a gage frame 29 provided with a screw 30 and constructed for clamping a flat table gage 31 which may be adjusted relative to the frame 29, said gage extending through the opening 28 of the table wall 27. The forward end of the gage 31 is slidable in a support 32, carried by the front wall 24 of the knee 6 and said support is provided with a suitable pointer or indicator 33 which overhangs the gage 31 and permits the operator of the machine to easily determine the distance the table 17 has been moved on the knee 6 by rotating the screw 23.

The table 17 is formed with shears 34 and 35 and slidable on said shears is a support 36 provided with flanges 37 and 38. The flange 37 is at the front edge of the table 17 and has a longitudinally disposed gage 38ª above which extends a pointer or indicator 39, carried by the gage frame 29. This pointer or indicator will permit of the operator of the machine readily determining the amount of movement of the support 36 relative to the table 17. The other flange 38 extends downwardly at the shear 35 and has a longitudinal slot 40 to receive a locking bolt 41 carried by the table 17, said locking bolt having a knurled nut 42 that may be adjusted to bind the flange 38 against the shear 35 and thereby secure the support in an adjusted position relative to the table 17.

The lower face of the support 36 has a longitudinal rack 43 confronting a slot 44 centrally of the table 17, and extending into slot and meshing with the rack 43 is a pinion 45 having a hub portion 46 rotatable in a bearing 47, carried by the table 17 below the shear 35 thereof. The hub portion 46 of the pinion 45 is held against longitudinal displacement relative to its bearing 47 and the hub portion of said pinion has a key or spline 48 extending into a groove 49 in a rotatable shaft 50, said shaft being journaled in the front and rear walls of the knee 6 so that it may be rotated to shift the support 36 longitudinally of the table 17. The sliding connection between the pinion 45 and the shaft 50 is essential in order that the table 17 may be adjusted by the screw 23 and at any position of the table permit of the support 36 being adjusted on the table by rotating the shaft 50.

On the outer or forward end of the shaft 50 is a hand wheel 51, somewhat similar to the hand wheel 26, with the exception that the periphery of the hand wheel 51 has teeth 52, corresponding to a worm gear, so that a worm 53 may mesh therewith. The worm 53 is disposed at the lower edge of the hand wheel 51 and is mounted on a shaft 54 journaled in a pivoted housing 55 carried by the front wall 24 of the knee 6. The pivoted housing 55 may be shifted to move the worm 53 out of engagement with the hand wheel 51, and the pivoted housing has a detent 56 to engage in the wall 24 and hold the worm housing in an inactive position. With the worm housing in an active position the shaft 50 can be rotated and the hand wheel 51 more minutely adjusted than if the wheel itself where driven by hand.

The top of the support 36 has longitudinal ways 57 adapted to anchor clamping members 58 and said clamping members normally engage the flange 59 of a cylindrical housing 60 seated on the support 36. The housing 60 is detachable so that it and appurtenant parts thereof may be bodily removed and thus permit of a piece of work being anchored directly on the support 36 for operation by the drill or tool of the machine.

Rotatable in the upper end of the housing 60 is a coupling ring 61 and secured on the upper end of said coupling ring is a work holder 62 which is circular in plan and has the upper face thereof provided with intersecting ways 63 permitting of clamps or other devices being employed for securing a piece of work on the work holder. The rotary work holder is connected to the coupling ring 61 by screws 64 or other fastening means and similar screws 65 are employed, for holding a worm gear 66 on the lower end of the coupling ring 61, said worm gear preventing vertical displacement of the rotary work holder.

The side of the housing 60 has an opening 67 exposing the worm gear 66 and said opening provides clearance for a worm housing 68 pivotally connected to a side lug 69 of the housing 60. In the worm housing 68 is journaled a shaft 70 on which is mounted a worm 71 adapted to mesh with the worm gear 66, so that the shaft 70 may be rotated to minutely adjust the worm gear 66 and the rotary work holder 62. The worm housing 68 has the free end thereof provided with a screw 72 that may be adjusted to engage in the housing 60 and lock the worm housing 68 in a closed position, otherwise, the worm housing 68 may be swung to an inactive position, somewhat similar to the worm housing 55 previously referred to.

Figure 8:
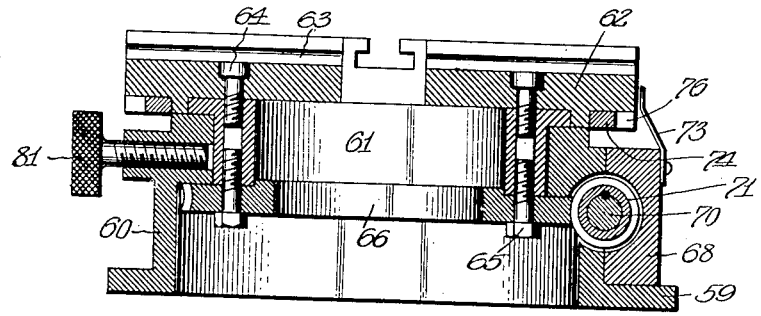
Fig. 8 is a vertical sectional view of the detached housing and its work holder.
Figure 9:
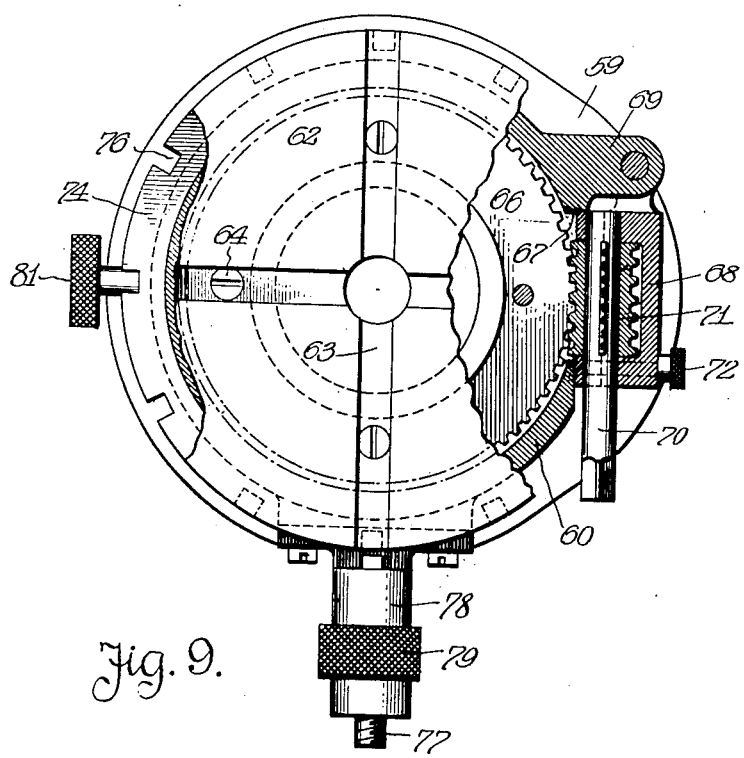
Fig. 9 is a plan of the same, partly broken away and partly in section.

The upper edge of the worm housing 68 is provided with a pointer or indicator 73 and when said worm housing is in a closed position, as shown in Figs. 8 ad 9, the pointer or indicator is in proximity to the periphery of the rotary work holder 62, which is graduated or calibrated, as shown in Fig. 3, thus permitting of the operator of the machine determining the amount of movement imparted to the rotary work holder 62 by the worm shaft 70.

By reference to Figs. 5 and 8, it will be observed that the rotary work holder is greater in diameter than the housing 60 and since the work holder is detachable by removing the screws 64, the lower overhanging edges of the work holder may be provided with interchangeable indexing rings 74 held in place by screws 75 or other fastening means. The index ring, as shown in Fig. 3, has a series of equally spaced notches 76 and adapted to engage in one of said notches and temporarily hold the work holder, is a bolt 77 adjustable in a forked or bifurcated bracket 78, carried by the housing 60. A knurled nut 79 is placed on the bolt 77 in the bifurcated end of the bracket and by rotating the nut the bolt 77 may be shifted into and out of engagement with the index ring of the rotary work holder.

The bolt 77 may also be locked in an adjusted position by a set screw 80 carried by the bracket 78.

Another set screw 81, best shown in Fig. 8, is carried by the housing 60 to engage the coupling ring 61 and hold said ring and the rotary work holder fixed relative to said housing.

From the foregoing it will be observed that the housing 60 and its appurtenant parts form an attachment that may be removed from the support 36 or used in connection therewith, the rotary work holder 62 being essential when a piece of work is to be intermittently rotated to permit of operations being carried on. When the piece of work is to be simply shifted longitudinally and transversely of the machine knee 6, then the piece of work may be connected direct to the support 36. In either instance, after the locking devices are released, the adjustment may be quickly made, particularly in connection with the index ring carried by the rotary work holder, as it is only necessary to place an index ring in position which will insure a positive intermittent rotary movement of the work holder. Then again, after certain adjustments have been made the worm housings 55 and 68 can be brought into action for minute adjustments, and it is through the medium of various adjustments associated with the entire device that I am able to perform operations with the greatest of precision, and consequently prevent many pieces of work from being discarded due to improper calculations.

It is thought that the operation and utility of my invention will be apparent without further description and I would have it understood that the invention is applicable to various types of machines.

What I claim is:—

1. A work holder for a cutting machine comprising an adjustable table, movable to and from the front of the machine, a screw for adjusting said table, a support slidable on said table, a rack carried by said support, a pinion extending through said table to engage said rack for moving said support on said table, a shaft supporting said pinion and disposed parallel to said screw, a hand wheel on said shaft, and means adapted to be placed in engagement with said hand wheel for minutely adjusting said hand wheel.

2. A work holder comprising an adjustable table, a support slidable thereon, a rack and pinion for moving said support on said table, a shaft supporting said pinion, a hand wheel on said shaft, and means including a pivoted worm housing and a worm in said housing for engagement with said hand wheel for minutely adjusting said hand wheel.

3. A machine of the type described, comprising a knee, an adjustable table on said knee, adjustable means carried by said knee for said table, a support slidable on said table, adjustable means carried by said knee for said support, the adjusting means of said table and support being disposed in parallelism, and operable at the front of said knee, and a gage adjustably held by said table and slidable in a portion of said knee to determine the movement of said table.

4. A machine as characterized in claim 3, wherein the gage is supported by a gage frame and said frame provided with a pointer coöperating with a gage on said support to indicate the movement of said support relative to said table.

5. A machine of the type described, comprising a knee, an adjustable table on said knee, table adjusting means carried by said knee for said table, a support slidable on said table, support adjusting means carried by said knee for said support and disposed in parallelism with said table adjusting means, and a worm housing on said knee adapted to be swung into engagement with the support adjusting means for minutely adjusting said support.

6. A machine of the type described, comprising a knee, an adjustable table on said knee, an adjustable support on said table, a detachable housing on said support, a rotary work holder on said housing, said work holder including a coupling ring in said housing, a worm gear connected to said ring, and a worm outside of said housing adapted to engage said worm gear to adjust said work holder.

7. A machine of the type described, comprising a knee, an adjustable table on said knee, an adjustable support on said table, a detachable housing on said support, a coupling ring in said housing, a work holder on said coupling ring, a worm gear carried by said coupling ring, and a worm housing and worm carried by said housing adapted to engage said worm gear to adjust said work holder.

8. A machine as characterized in claim 7 wherein the worm housing and worm are pivotally supported by the housing and adapted to be locked in engagement therewith.

9. A machine as characterized in claim 7, wherein indexing means is carried by said housing and said work holder.

In testimony whereof I affix my signature in the presence of two witnesses.

JULIAN W. WAGNER

Witnesses:
KARL H. BUTLER,
G. E. McGRANN.